United States Patent
Nagasawa et al.

(10) Patent No.: US 7,804,642 B2
(45) Date of Patent: Sep. 28, 2010

(54) SCANNING EXAMINATION APPARATUS

(75) Inventors: Nobuyuki Nagasawa, Hino (JP); Masahiro Oba, Hino (JP); Tetsuya Koike, Komagane (JP); Yoshihisa Tanikawa, Tokyo (JP); Yujin Arai, Tokyo (JP)

(73) Assignee: Olympus Corporation, Tokyo (JP)

( * ) Notice: Subject to any disclaimer, the term of this patent is extended or adjusted under 35 U.S.C. 154(b) by 420 days.

(21) Appl. No.: 11/913,833

(22) PCT Filed: May 16, 2006

(86) PCT No.: PCT/JP2006/309715

§ 371 (c)(1),
(2), (4) Date: Nov. 7, 2007

(87) PCT Pub. No.: WO2006/123641

PCT Pub. Date: Nov. 23, 2006

(65) Prior Publication Data

US 2009/0073554 A1   Mar. 19, 2009

(30) Foreign Application Priority Data

| May 16, 2005 | (JP) | 2005-142376 |
| Jul. 12, 2005 | (JP) | 2005-202830 |
| Sep. 2, 2005 | (JP) | 2005-254917 |

(51) Int. Cl.
*G02B 21/06* (2006.01)
(52) U.S. Cl. .................... 359/385; 359/368
(58) Field of Classification Search ............ 359/368, 359/385–389; 250/201.3
See application file for complete search history.

(56) References Cited

U.S. PATENT DOCUMENTS

| 5,737,121 A | 4/1998 | Dixon |
| 6,980,701 B1 | 12/2005 | Itoh |
| 2002/0160369 A1 | 10/2002 | Dorsel et al. |
| 2008/0030849 A1* | 2/2008 | Fukuyama .................. 359/381 |

FOREIGN PATENT DOCUMENTS

| JP | 61219919 | 9/1986 |
| JP | 62-261905 | 11/1987 |
| JP | 07333522 | 12/1995 |
| JP | 08005928 | 1/1996 |
| JP | 11133311 | 5/1999 |
| JP | 2000035400 | 2/2000 |
| JP | 2002-084414 | 3/2002 |
| JP | 3458003 | 8/2003 |
| JP | 2004110017 | 4/2004 |
| JP | 2005099662 | 4/2005 |

OTHER PUBLICATIONS

European Search Report dated Apr. 6, 2009 for Appl. No. 06746429.7

\* cited by examiner

*Primary Examiner*—Alessandro Amari
(74) *Attorney, Agent, or Firm*—Pillsbury Winthrop Shaw Pittman, LLP

(57) ABSTRACT

A scanning examination apparatus 1 is provided, the apparatus including a detachable objective lens 6 or 6', a scanner 3 for two-dimensionally scanning light F from a specimen 100 focused by the objective lens 6 or 6', a scanner control device 13 for controlling the operation of the scanner 3, and an optical detector 9 for detecting light scanned by the scanner 3, wherein the scanner control device 13 changes the scanning direction of the light F depending on an image formation mode of the light F at the objective lens 6 or 6' which is attached.

2 Claims, 13 Drawing Sheets

SCANNING EXAMINATION APPARATUS

CROSS-REFERENCE TO RELATED APPLICATIONS

This application is a U.S. National Stage entry of International Application No. PCT/JP2006/309715, filed on May 16, 2006. International application PCT/JP2006/309715 claims priority to Japanese Application No. 2005-142376, filed May 16, 2005, Japanese Application No. 2005-202830, filed Jul. 12, 2005, and Japanese Application No. 2005-254917, filed Sep. 2, 2005. The entire contents of each of these applications are incorporated herein by reference.

TECHNICAL FIELD

The present invention relates to a scanning examination apparatus, such as a scanning microscope, that scans light by operating a scanner.

BACKGROUND ART

A known scanning examination apparatus, such as a scanning microscope, two-dimensionally scans light emitted from a light source by a scanner, irradiates a specimen with the light, collects the returned light, such as fluorescence generated at the specimen, with an objective lens, splits off the returned light with a dichroic mirror while it is being returned via the scanner, and detects the light with an optical detector. The scanner is, for example, a so-called proximity galvanometer mirror formed of two galvanometer mirrors disposed opposite to each other that are capable of rotating around two mutually orthogonal axes. The scanning examination apparatus is capable of acquiring one fluorescence image by linking and storing position information of illumination positions determined by the rotation angle of each galvanometer mirror and intensity information detected by the optical detector (refer to, for example, Japanese Unexamined Patent Application, Publication No. SHO-61-219919 and Publication of Japanese Patent No. 3458003). The obtained image is displayed on a monitor and can be examined on the monitor.

A known scanning examination apparatus, such as a scanning microscope, usually includes a plurality of objective lenses having different magnifications, and the examination magnification can be changed by changing the objective lens. In this case, objective lenses having the same image-formation mode are used, and even when the objective lens is changed, the image displayed on the monitor is an image observed from the same direction.

Patent Document 1:
Japanese Unexamined Patent Application, Publication No. SHO-61-219919
Patent Document 2:
Publication of Japanese Patent No. 3458003

DISCLOSURE OF INVENTION

The above-described known scanning examination apparatus has a problem in that, when objective lenses having different image formation modes are used and the acquired image is directly displayed on the monitor, it is difficult to observe the image because it is rotated or reversed. In such a case, adapters that match the image formation modes of a plurality of objective lenses may be used or the acquired image may be processed to rotate or reverse the image. In this way, the image of the specimen observed from the same direction can be displayed, regardless of the objective lens used. However, when an adapter is used, there are problems in that the number of components increases, attachment space for the adapter has to be provided in advance, and the structure becomes complex. When the acquired image is processed to reverse it, there are problems in that, since image processing has to be carried out after image information corresponding to one entire image is acquired, the image being observed cannot be displayed on the monitor in real time and a processing device is required for processing the image at high speed.

The present invention has been conceived in light of the problems described above. Accordingly, it is an object of the present invention to provide a scanning examination apparatus that can easily display an image of a specimen observed from the same direction without adding special components or processing devices, even when a plurality of objective lenses having different image formation modes are used.

To achieve the above-described objective, the present invention provides the following solutions.

A first aspect of the present invention provides a scanning examination apparatus including a detachable objective lens, a scanner for two-dimensionally scanning light from a specimen focused by the objective lens, a scanner control device for controlling the operation of the scanner, and an optical detector for detecting light scanned by the scanner, wherein the scanner control device changes the scanning direction of the light depending on an image formation mode of the light in the objective lens which is attached.

According to this aspect, light from the specimen focused by the objective lens is scanned by the scanner and is detected by the optical detector. By linking and storing the luminance of the light detected by the optical detector and the scan positions of the scanner, one set of image information of the specimen can be acquired each time the scanner scans a predetermined scanning range. In such a case, when an objective lens having a different image formation mode is attached by changing the objective lens, the scanner control device changes the scanning direction of the light from the specimen. In this way, even when an objective lens having a different image formation mode is attached, an image of the specimen observed from the same direction can be displayed without reversing or rotating the image.

In the first aspect, the scanner may scan the light in two directions orthogonal to each other, and the scanner control device may carry out control to scan light in directions opposite to the two directions when image formation occurs an odd number of times in the objective lens and when image formation occurs zero or an even number of times.

When image formation in the objective lens occurs an odd number of times or zero or an even number of times, if no countermeasure is taken, the displayed image is rotated by 180. According to the present invention, by reversing the directions of the scanning directions of the scanner which scans light in two directions orthogonal to each other when image formation occurs an odd number of times or any other number of times, an image of the specimen observed from the same direction can be displayed in either case.

A second aspect of the present invention provides a scanning examination apparatus including a detachable objective lens, a scanner for two-dimensionally scanning light from a specimen focused by the objective lens, an optical detector for detecting light scanned by the scanner, and an image processing device for storing intensity information of the light detected by the optical detector in the memory at address positions aligned in a corresponding manner to positions on an image, wherein the image processing device changes the storage order according to an image formation mode of the objective lens which is attached.

In this aspect, light from the specimen focused by the objective lens is two-dimensionally scanned by the scanner and is detected by the optical detector. By operating the image processing device, intensity information of the scan positions detected by the optical detector and the scan positions of the scanner are linked and recorded. At this time, these are stored in address positions aligned in a corresponding manner to the positions on the image. The intensity information stored in the address positions is called up in order of the addresses and is displayed on the monitor.

In this case, since the image processing device changes the storage order in the memory according to the image formation mode of the attached objective lens, even when objective lenses having different image formation modes are attached, images observed from the same direction can be easily displayed without changing the call-up order when displaying the intensity information contained in the memory.

In the second aspect, the image processing device may reverse the order of storing intensity information when image formation occurs an odd number of times in the objective lens and when image formation occurs zero or an even number of times.

If no countermeasure is taken, the displayed image is rotated by 180 when image formation occurs an odd number of times and when image formation occurs any other number of times. According to this aspect, when image formation occurs an odd number of times or any other number of times in the attached objective lens, the image processing device changes the storage order in the memory; therefore even when objective lenses having different image formation modes are attached, images observed from the same direction can be easily displayed without changing the call-up order when displaying the intensity information contained in the memory.

The scanning examination apparatuses according to the first and second aspects of the present invention have an advantage in that an image of a specimen observed from the same direction can be easily displayed without adding special components or processing devices, even when a plurality of objective lenses having different image formation modes are used.

BEST MODE FOR CARRYING OUT THE INVENTION

1. First Embodiment

Figure 2:
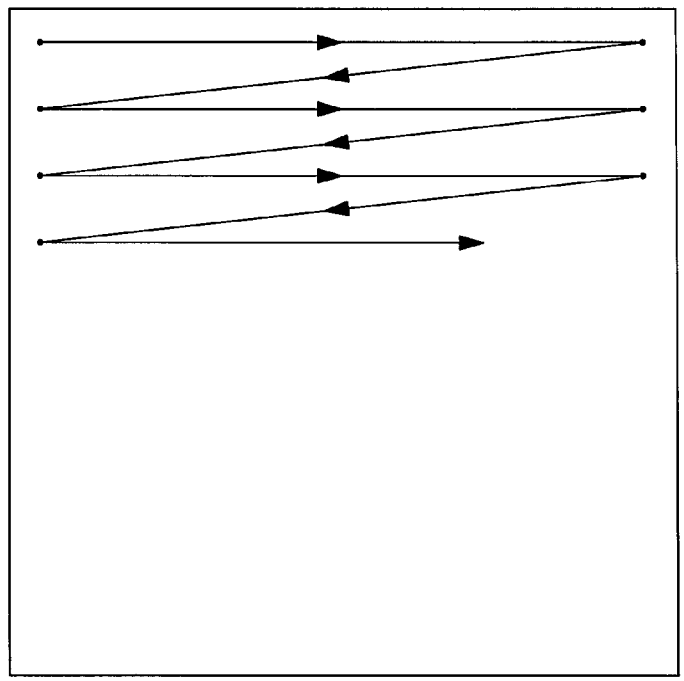
FIG. 2 illustrates an example scanning trajectory of a laser beam incident on a standard objective lens from the scanning examination apparatus shown in FIG. 1.
Figure 3:
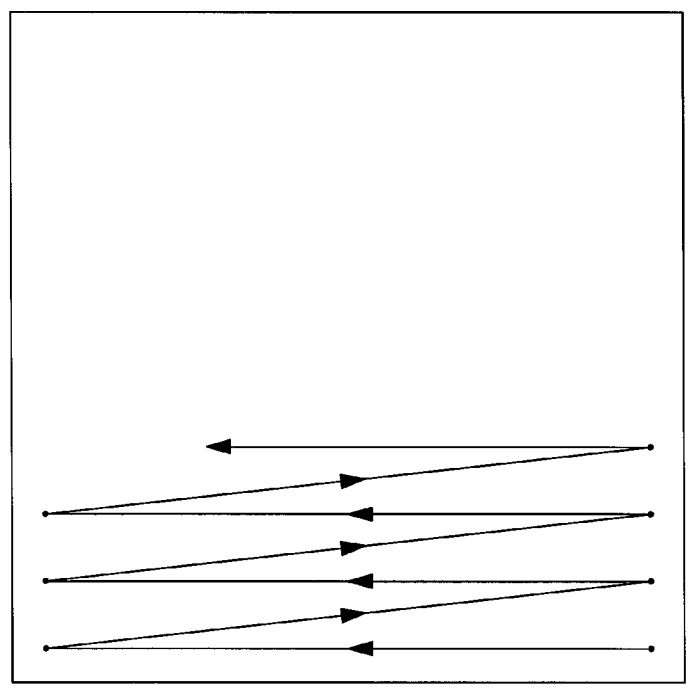
FIG. 3 is an example scanning trajectory of a laser beam incident on an objective lens from the scanning examination apparatus shown in FIG. 1, where image formation occurs an odd number of times.

A scanning examination apparatus 1 according to a first embodiment of the present invention is described below with reference to FIGS. 1 to 3.

Figure 1:
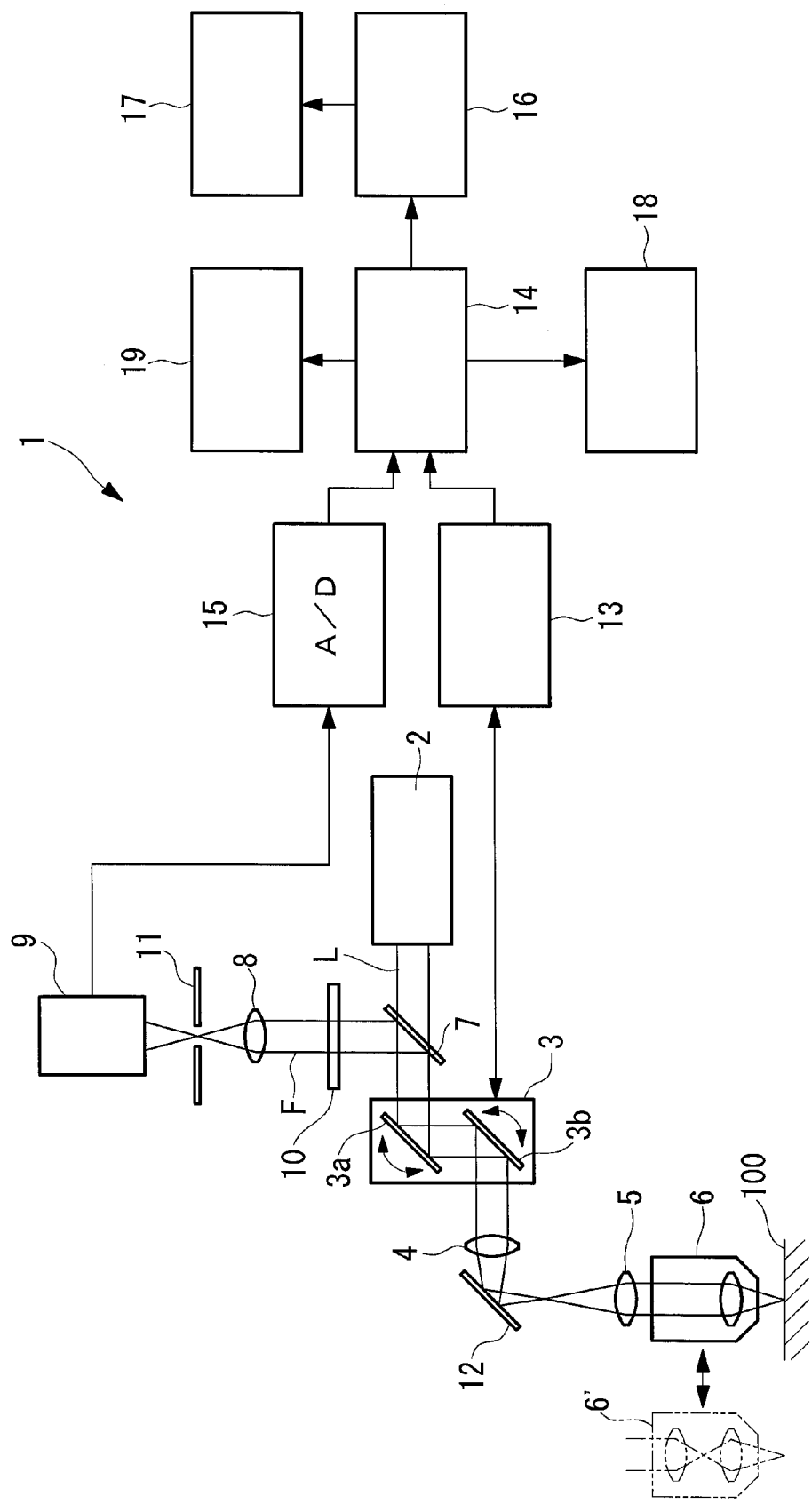
FIG. 1 illustrates the overall structure of a scanning examination apparatus according to a first embodiment of the present invention.

As shown in FIG. 1, the scanning examination apparatus 1 according to this embodiment is a laser scanning fluorescence microscope and includes a laser light source 2 that generates a laser beam, a scanner 3 that scans a laser beam L generated at the laser light source 2, a pupil projection lens 4 that focuses the laser beam L scanned by the scanner 3, an image-forming lens 5 that substantially collimates the laser beam L focused by the pupil projection lens 4, an objective lens 6 or 6' that irradiates a specimen 100 with the laser beam L collimated at the image-forming lens 5, a dichroic mirror 7 that separates fluorescence F generated at the specimen 100, which is irradiated with the laser beam L via the objective lens 6 or 6', from the laser beam L, a focusing lens 8 that focuses the separated fluorescence F, and an optical detector 9 that detects the fluorescence F focused by the focusing lens 8. The optical detector 9 is, for example, a photomultiplier tube (PMT). In the drawings, reference numeral 10 represents a barrier filter, reference numeral 11 represents a pinhole, and reference numeral 12 represents a mirror.

The scanner 3 is a so-called proximity galvanometer mirror and includes a first galvanometer mirror 3a for scanning the laser beam L in a main scanning direction corresponding to the left and right directions of the image and a second galvanometer mirror 3b for scanning the laser beam L in a sub scanning direction corresponding to the up and down directions of the image. In this way, the specimen 100 is irradiated with the laser beam L according to a raster scan method.

The scanner 3 is connected to a scanner control device 13 that controls the scanner 3, and the scanner control device 13 is connected to a control device (CPU) 14. The CPU 14 sends instructions for a scanning range of the laser beam L for the scanner 3 to the scanner control device 13, and the CPU 14 receives scan position information of the scanner 3 from the scanner control device 13. The CPU 14 is connected to the optical detector 9 via an A/D converter 15, and intensity information of the fluorescence F detected by the optical detector 9 is input to the CPU 14.

The CPU 14 is connected to a monitor 17 via a frame memory 16. The CPU 14 is connected to, for example, a recording device 18, such as a hard disk, and a memory 19.

Position information of the scanner 3 and intensity information input to the CPU 14 are linked by the CPU 14 and recorded in the memory 19. By storing linked information for the entire scanning range of the scanner 3, one set of image information is created.

The frame memory 16 has address positions corresponding to pixels in the vertical and horizontal directions of an image. Intensity information corresponding to the obtained scan positions is stored in order in the address positions of the frame memory 16. The intensity information stored in the address positions of the frame memory 16 is output to the monitor 17 every time it is stored or when a set of intensity information corresponding to one screen is stored. In this way, the captured image of the specimen 100 is displayed on the monitor 17 in real time.

According to this embodiment, the scanner control device 13 is structured such that the scanning direction of the scanner 3 is reversed according to the image formation mode in the objective lens 6 or 6'. In other words, the scanning direction of the scanner 3 is switched depending on whether image formation occurs an odd number of times or any other number of times in the objective lens 6 or 6'.

More specifically, when a standard objective lens 6 that does not form an image in the objective lens 6 (image formation occurs zero times) is installed, for example, an image is obtained while the first galvanometer mirror 3a of the scanner 3 scans the laser beam L from left to right and the second galvanometer mirror 3b scans the laser beam L from top to bottom. Therefore, the intensity information of the upper left corner of the scanning range on the specimen 100 is stored in the address position of the frame memory 16 corresponding to a pixel at the upper left corner of the image. While the scanning range on the specimen 100 is being scanned to the upper right corner by the operation of the first galvanometer mirror 3a, the intensity information of the scan positions is stored in order in the corresponding address positions.

After the intensity information for the first row in the scanning range is obtained, the scanning range moves to the second row by the operation of the second galvanometer mirror 3b, and the same process is repeated. This is the same even when image formation occurs an even number of times of two or greater, in the objective lens 6. In this way, as shown in FIG. 2, the laser beam L is scanned from the upper left corner to the lower right corner, with respect to the objective lens 6, according to the raster scan method.

When the objective lens 6' inside which image formation occurs an odd number of times is selected, the scanner control device 13 reverses the scanning directions of both the first and second galvanometer mirrors 3a and 3b of the scanner 3. In other words, the scanning directions are switched so that an image is obtained while the first galvanometer mirror 3a scans from right to left and the second galvanometer mirror 3b scans from bottom to top. In this way, as shown in FIG. 3, the laser beam L is scanned, with respect to the objective lens 6', from the lower right corner to the upper left corner according to the raster scan method. Since an image is rotated by 180 in the objective lens 6', the image displayed on the monitor 17 is the same as that of the objective lens 6 inside which image formation occurs zero or an even number times.

More specifically, the image displayed on the monitor 17 is rotated by 180 depending on whether image formation occurs an odd number or any other number of times inside the objective lens 6 or 6'. However, according to this embodiment, by reversing the scanning directions by the scanner control device 13, an image observed from the same direction is displayed on the monitor 17.

The operation of the scanning examination apparatus 1 according to this embodiment, having the above-described structure, will be described below.

To examine the specimen 100 using the scanning examination apparatus 1 according this embodiment, the laser beam L emitted from the laser light source 2 is incident on the scanner 3, and the two galvanometer mirrors 3a and 3b that constitute the scanner 3 are rotated by rotation angles corresponding to the scanning range set by the scanner control device 13.

When the standard objective lens 6 is installed, this information is input to the CPU 14 by the observer, the information is sent from the CPU 14 to the scanner control device 13, and the scanning direction of the scanner 3 is set to a normal mode. The laser beam L generated at the laser light source 2 is, for example, scanned from the upper left corner to the lower right corner of the scanning range on the specimen 100 according to the raster scan method, causing the fluorescent material contained in the specimen 100 to be excited and generate fluorescence F at each position on the specimen 100. The fluorescence F generated at the specimen 100 is returned along the same path as the laser beam L via the objective lens 6, the image-forming lens 5, the pupil projection lens 4, and the scanner 3, separated at the dichroic mirror 7, focused by the focusing lens 8, and detected by the optical detector 9.

The intensity information of the fluorescence F detected by the optical detector 9 and the scan position information of the scanner 3 from the scanner control device 13 are sent to the CPU 14, linked to each other at the CPU 14, and stored in the memory 19. Since each scan positions of the scanner 3 and the address positions of the frame memory 16 are linked to each other, the intensity information of each scan position detected by the optical detector 9 is stored in the address position of the frame memory 16 corresponding to the scan position. The intensity information stored in the frame memory 16 is directly displayed on the monitor 17, and one set of image information is displayed on the monitor 17 while the scanner 3 scans the entire scanning range.

When the objective lens 6', inside which image formation occurs an odd number of times, is selected, this information is input to the CPU 14 by the observer, and the information is sent from the CPU 14 to the scanner control device 13. The scanner control device 13 reverses both scanning directions of the laser beam L by the two galvanometer mirrors 3a and 3b constituting the scanner 3.

In other words, the scanner 3 irradiates the objective lens 6' with the laser beam L scanned in the opposite direction from the above-described direction. Then, since the laser beam L incident on the objective lens 6' forms images an odd number of times in the objective lens 6' and is rotated by 180, the laser beam L can be scanned, on the specimen 100, from the upper left corner to the lower right corner of the scanning range according to the raster scan method, in the same manner as the objective lens 6 inside which image formation occurs zero or an even number of times.

As a result, in the same way as described above, at each position on the specimen 100, fluorescent material contained in the specimen 100 is excited to generate fluorescence F. The generated fluorescence F is returned along the same path as the laser beam L via the objective lens 6', the image-forming lens 5, the pupil projection lens 4, and the scanner 3, separated at the dichroic mirror 7, focused by the focusing lens 8, and detected by the optical detector 9. Therefore, the image of the specimen 100 displayed on the monitor 17 is not rotated but is displayed as an image observed from the same direction.

More specifically, with the scanning examination apparatus 1 according to this embodiment, even if the objective lens is switched between the objective lenses 6 and 6' that have different image formation modes, in particular, in which image formation occurs a different number of times, when changing the magnification according to use or when using the objective lens 6' having a small-diameter tip that can be inserted into the specimen 100, an image observed from the same direction can be displayed on the monitor 17, and the ease of examination by the observer is improved.

The scanning examination apparatus 1 according this embodiment has an advantage in that, even when the objective lens is changed to the objective lens 6 or 6' that have different image formation modes, an image observed from the same direction can be displayed on the monitor 17 at low cost, without adding a special component, such as insertion of an image rotator.

According this embodiment, information about whether or not image formation occurs an odd number of times in the objective lens 6 or 6' is input to the CPU 14 by the observer. Instead, however, the objective lens 6 or 6' may include an identification tag, such as an RF tag, and a sensor (not shown) for reading the tag may be disposed in the main body part of the examination apparatus so that the operation of the scanner 3 by the scanner control device 13 automatically changes when the objective lens is switched between the objective lenses 6 and 6'.

2. Second Embodiment

Figure 4:
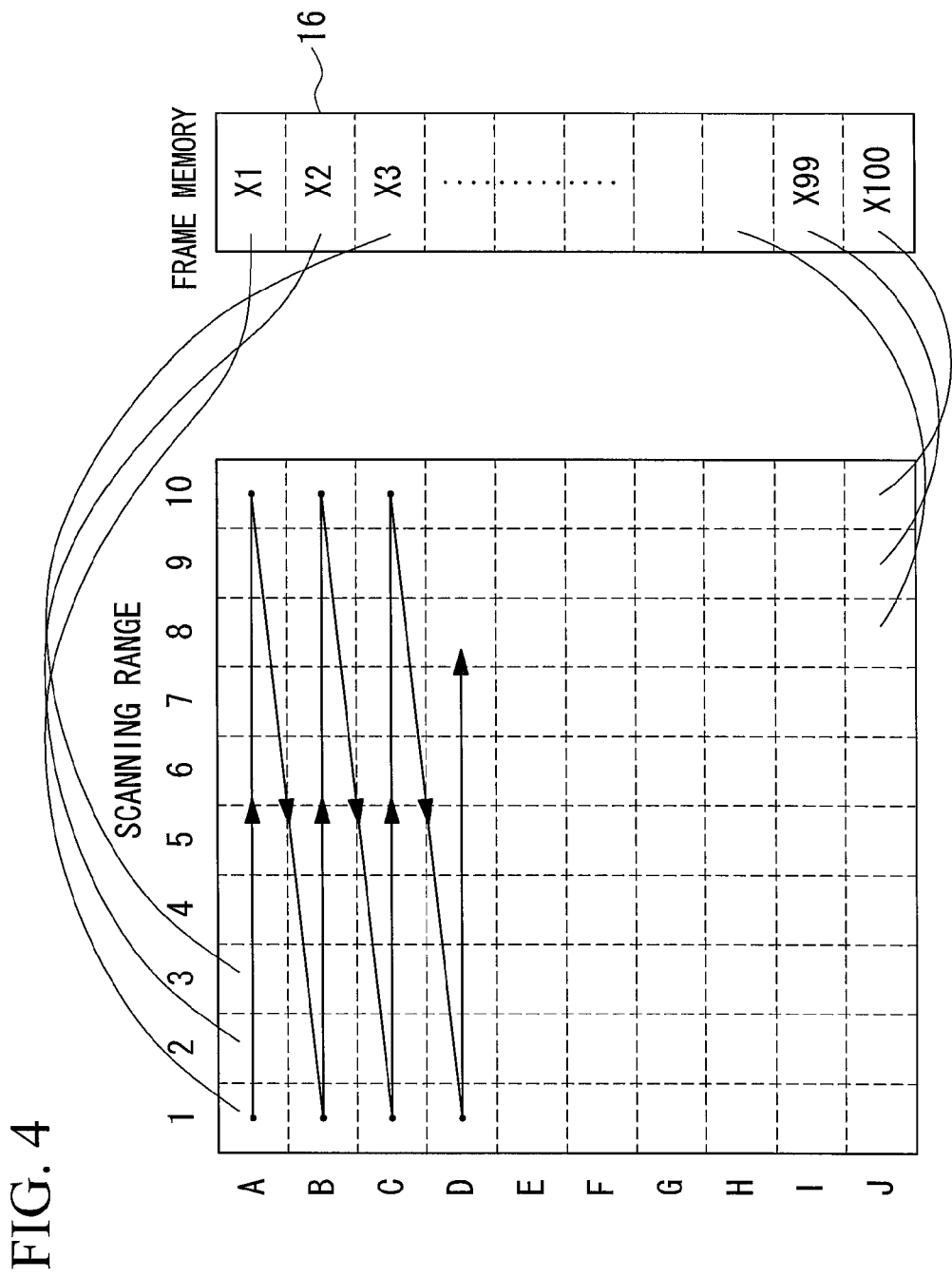
FIG. 4 illustrates the correspondence between a laser beam scanning range and frame memory when a standard objective lens is installed in a scanning examination apparatus according to a second embodiment of the present invention.
Figure 5:
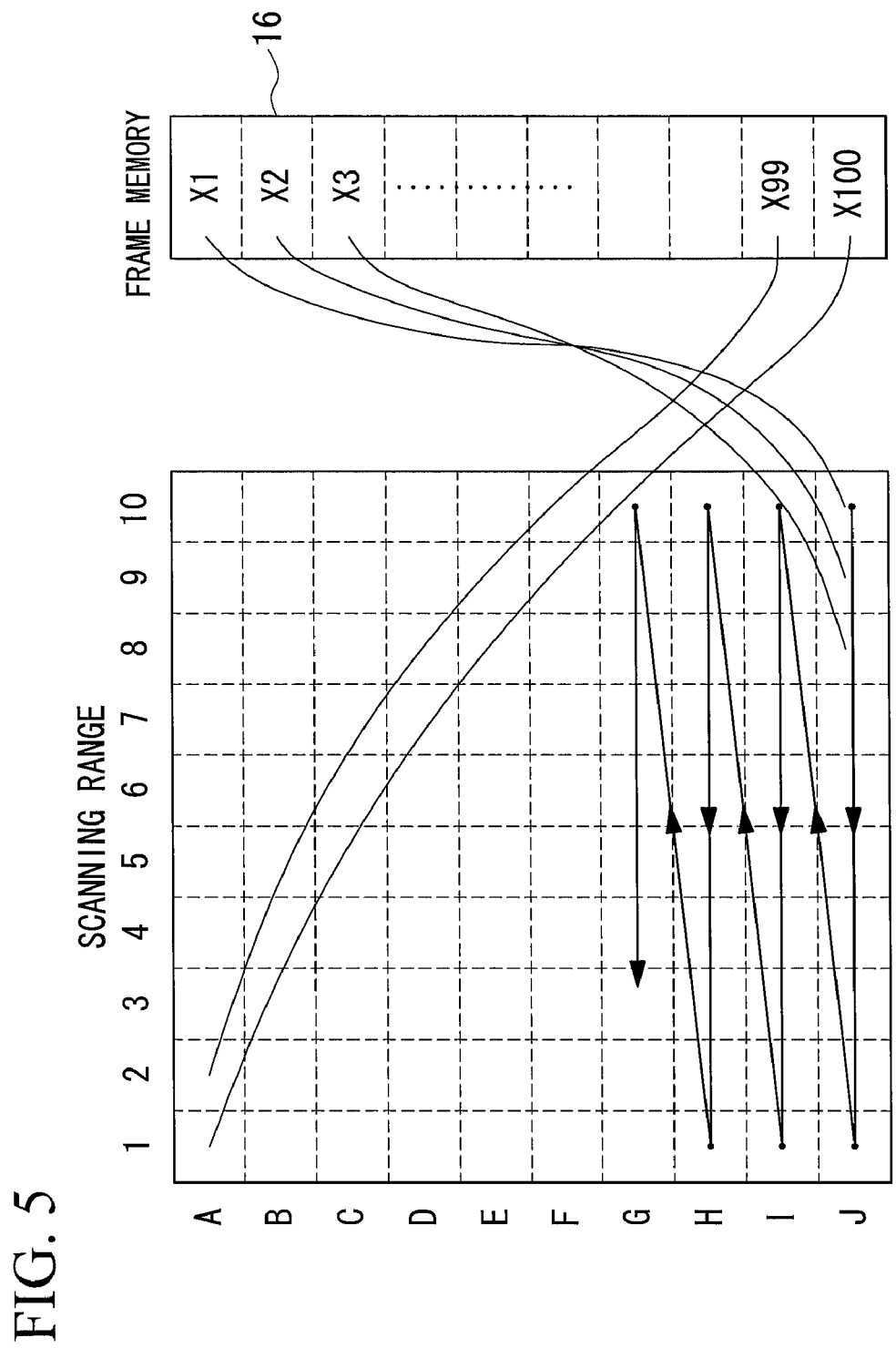
FIG. 5 illustrates the correspondence between a laser beam scanning range and frame memory when an objective lens in which image formation occurs an odd number of times is installed to the scanning examination apparatus according to the second embodiment of the present invention.

Next, a scanning examination apparatus 1 according to a second embodiment of the present invention will be described below with reference to FIGS. 4 and 5.

In the description of this embodiment, parts that are the same as those of the scanning examination apparatus 1 according the above-described first embodiment will be represented by the same reference numerals, and descriptions thereof will be omitted.

With the scanning examination apparatus 1 according this embodiment, instead of changing the operation of the scanner 3 by the scanner control device 13, the operation of the scanner 3 is not changed but the storage order of intensity information in the frame memory 16 is changed.

As described above, positions in the scanning range on the specimen 100 are linked to address positions of the frame memory 16. For example, as shown in FIG. 4, when the scanning range on the specimen 100 is divided into 10×10 scan positions from A1 to J10, the scan positions are linked to the 100 address positions from X1 to X100 of the frame memory 16. Then, when intensity information of each scan position is obtained, the CPU (image processing device) 14 stores the intensity information in each address position of the frame memory 16 corresponding to each scan position.

In the scanning examination apparatus 1 according to this embodiment, when the standard objective lens 6 is installed, the intensity information from the scan position A1 on the specimen 100 is stored in the address position X1 of the frame memory 16, the intensity information from the scan position A2 is stored in the address position X2 of the frame memory 16, and so on: that is, the intensity information is stored in order. Therefore, by the operation of the scanner 3, the laser beam L is scanned in order, from the scan positions A1 to A10, from B1 to B10, . . . , and from J1 to J10, and the intensity information at the scan positions is stored, in order, in the address positions X1 to X100 of the frame memory 16.

In the scanning examination apparatus 1 according this embodiment, when the objective lens 6' inside which image formation occurs an odd number of times is installed, the CPU 14 reverses the storage order in the frame memory 16. More specifically, if the laser beam L is incident in the same manner as when the standard objective lens 6 is installed, the laser beam L forms an odd number of images in the objective lens 6'. As a result, the laser beam L is rotated by 180 so that it is first incident on the scan position J10, which is the diametrically opposite scan position on the specimen 100, and generates fluorescence F at this position.

Then, the generated fluorescence F is returned after being collected by the objective lens 6' and is detected by the optical detector 9. Therefore, since the intensity information detected by the optical detector 9 corresponds to the scan position J10 on the specimen 100, the CPU 14 stores the intensity information in the address position X100 of the frame memory 16, corresponding to the scan position J10.

More specifically, since the scanner 3 is operated in the same direction as when the standard objective lens 6 is installed, the laser beam L is incident on the scan positions J10 to A1 on the specimen 100 in this order. Then, as shown in FIG. 5, the intensity information of the fluorescence F generated at the scan positions J10 to A1 is stored, in this order, by the CPU 14 in the address positions X100 to X1 of the frame memory 16 in this order, which is the reversed order of when the standard objective lens 6 is installed.

In this way, even when the objective lens 6' inside which image formation occurs an odd number of times is installed, the correspondence between the address positions X1 to X100 of the frame memory 16 and the scan positions A1 to J10 corresponding to the intensity information stored therein is the same as that when the objective lens 6 inside which image formation occurs zero or an even number of times is installed, and an image of the specimen 100 observed from the same direction can be displayed.

In this case, similar to the above-described first embodiment, the scanning examination apparatus 1 according this embodiment can display an image observed from the same direction on the monitor 17 at low cost, without adding a special component, such as an image rotator.

Similar to the above-described first embodiment, in this embodiment also, an arbitrary identification tag may be provided on the objective lens 6 or 6', a sensor for reading this may be disposed in the main body part of the examination apparatus, and the operation of the CPU 14 may be automatically changed depending on the type of the objective lens 6 or 6' installed.

In some cases, a scanning examination apparatus such as that described above is used for in vivo examination of a small laboratory animal by, for example, inserting the tip underneath the skin of the small laboratory animal, such as a mouse, and it is thus necessary to form the objective lens with a narrow tip. In such a case, the light beam passing through the objective lens must be maintained significantly narrow. In order to achieve this, an optical system that relays light inside the objective lens by forming a plurality of images may be configured. At this time, image formation may occur an odd number of times or an even number of times, depending on the distance the light is relayed.

When image formation occurs an odd number of times inside the objective lens, the image is rotated by 180 inside the objective lens. If the image rotates by 180 inside the objective lens, the following problems occur when employing a method of moving the objective lens relative to the specimen.

Specifically, when the relative positions of the objective lens and the specimen are set while visually observing from outside, the observer operates the cross key to move the objective lens relative to the specimen. It is needless to point out that, at this time, it is preferable to configure the cross key such that the objective lens moves to the right with respect to the specimen when the right side of the cross key is pushed and moves to the left when the left side of the cross key is pushed.

However, since the image is rotated by 180 inside the objective lens when image formation occurs an odd number of times inside the objective lens, the image displayed on the monitor is rotated by 180. Therefore, this is a problem in that, when the observer who is only observing the specimen on the monitor wants to farther observe the right side of the specimen, he or she has to push the left side of the cross key, and when the observer wants to observe the left side, he or she has to push right side of the cross key.

The same situation occurs when image formation occurs zero or an even number of times inside the objective lens.

More specifically, even when the image is not rotated inside the objective lens, when a method of moving the specimen relative to the fixed objective lens is employed, the observer operates the cross key so as to move the objective lens relative to the specimen when setting the relative positions of the objective lens and the specimen while visually observing the objective lens and the specimen from outside. At this time, it is preferable, from the viewpoint of operability, to configure the cross key so that the specimen moves to the right with respect to the objective lens when the observer pushes the right side of the cross key and moves to the left when the observer pushes the left side of the cross key.

However, in this case also, when the observer who is only observing the specimen on the monitor wants to further observe the right side of the specimen and pushes the right side of the cross key, the specimen moves to the right with respect to the objective lens. As a result, there is a problem in that the section on the left side of the specimen is displayed on the monitor.

As in such cases, there is a problem in that if the displayed specimen moves in the opposite direction to that intended by the observer when the observer carries out an operation while observing the monitor, the target position on the specimen may be lost if the magnification is great, thus, in some cases, missing an opportunity for examination. Such a problem is not limited to the scanning examination apparatus according to the above-described first or second embodiment, but is a problem also common to known scanning examination apparatuses.

Known scanning examination apparatuses also have the following problems. In a scanning examination apparatus such as a confocal scanning microscope, a spot of light such as a laser beam and a pinhole are combined to carry out pinpoint irradiation of the specimen so as to suppress scattered light from areas other than the measurement point. Furthermore, a pinhole is disposed in front of an optical detector as a spatial filter so as to image a noise beam which is on the same plane as the measurement point around the pinhole. By suppressing the light passing through the pinhole by spreading the light from a plane deviating from the optical-axis direction with the objective lens before the pinhole, reflected light and transmitted light from areas other than the measurement point are cut off and converted into an image by a photoelectric converter.

At the same time, the color of the specimen irradiated with the spot of light, such as a laser beam, to form an image is degraded by the laser beam. As a solution for this problem in the related art, a method of preventing color degradation in areas other than a target region is known, wherein the location to be irradiated with the spot of light, such as a laser beam, is registered as a target region and is irradiated with the spot of light, such as a laser beam, having a required wavelength within the target region (refer to, for example, Japanese Unexamined Patent Application, Publication No. 2000-35400). Moreover, since areas other than the target region are not irradiated with the spot of light, such as a laser beam, unnecessary luminance data of the image to be acquired can be ignored.

However, with the above-described method, the target region has to be assigned on the specimen and settings for the spot of light, such as a laser beam, have to be configured. Therefore, when there are many specimens or when it is difficult to focus on the target region, a large amount of work is required. Furthermore, since the above-described method is a method specialized for the specimen, limitations on the hardware of the scanning examination apparatus are not taken into consideration.

Since the scanning examination apparatus uses an objective lens, the viewing range depends on the objective lens, and the viewing range of the objective lens is circular. On the other hand, since the scanning examination apparatus acquires an image by scanning a spot of light, such as a laser beam, in the X-axis direction and the Y-axis direction, the scanning range is normally rectangular.

With a known scanning examination apparatus, the quadrangle inscribed in the circular field of view is often set to a magnification of one. In such a case, there is a problem in that a specific range of the image in the vertical and horizontal direction of the viewing range of the objective lens cannot be efficiently used. To solve this problem, the scanning range is set as a quadrangle circumscribing the circular field of view. In this way, the field of view of the objective lens can be efficiently used.

However, the wanted image is located near the center of the circumscribed quadrangle, and an unwanted image that is not a reflection image or a transmission image is acquired in the periphery. As a result, in the region of the unwanted image, abnormal luminance may be generated due to scanning the spot of light, such as a laser beam, on the objective lens itself, causing problems such as indistinctness of the wanted image and complicated analysis of the acquired image.

As described above, the scanning examination apparatus has various problems in addition to the problems solved by the above-described first and second embodiments of the present invention.

Accordingly, in a third embodiment of the present invention described below, a scanning examination apparatus that is capable of moving a specimen on the monitor in a manner intended by the observer observing the specimen only on the monitor and that is provided with the objective of preventing problems such as losing a target position and missing an opportunity for examination will be described.

Moreover, in fourth and fifth embodiments of the present invention, scanning examination apparatuses having the objective to prevent indistinctness of an image due to the difference between the scanning range of a spot of light and a viewing range and to simplify the analysis after image acquisition are described.

3. Third Embodiment

A scanning examination apparatus 31 according to the third embodiment of the present invention will be described below with reference to FIGS. 6 to 10.

Figure 6:
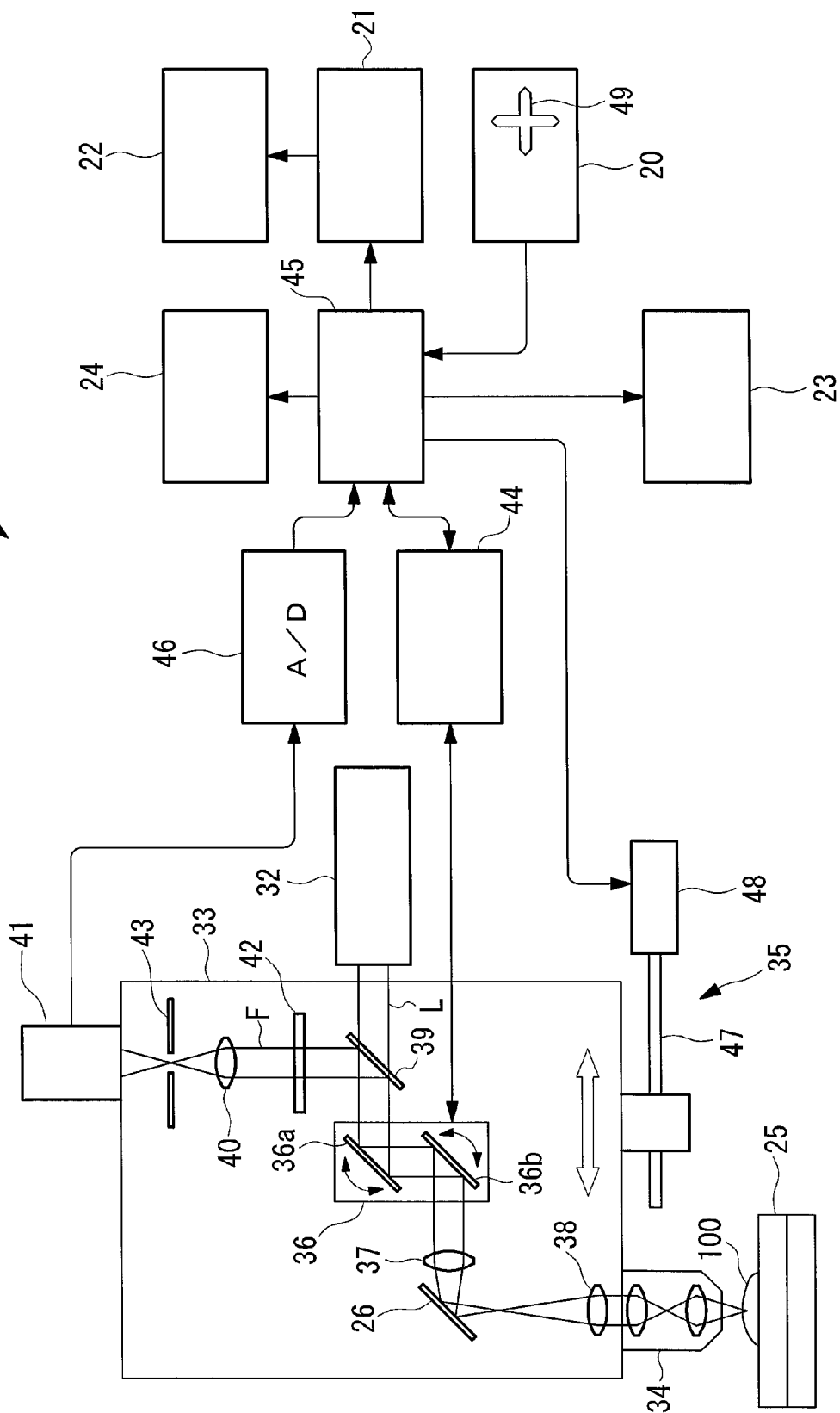
FIG. 6 illustrates the overall structure of a scanning examination apparatus according to a third embodiment of the present invention.

As shown in FIG. 6, the scanning examination apparatus 31 according this embodiment is a laser scanning fluorescence microscope including a laser light source 2 that emits a laser beam L, an observation head 33 that irradiates a specimen 100 with the laser beam L generated at the laser light source 32 and detects the fluorescence F generated at the specimen 100, and a moving mechanism 35 that moves the observation head 33 in a direction orthogonal to the optical axis of an objective lens 34 with respect to the specimen 100. The observation head 33 includes a scanner 36 that scans the laser beam L generated at the laser light source 32, a pupil projection lens 37 that focuses the laser beam L scanned by the scanner 36, an image-forming lens 38 that substantially collimates the laser beam L focused by the pupil projection lens 37, the objective lens 34 that irradiates the specimen 100 with the laser beam L substantially collimated by the image-forming lens 38, a dichroic mirror 39 that separates the fluorescence F, which is generated at the specimen 100 irradiated with the laser beam L by the objective lens 34, from the laser beam L, a focusing lens 40 that focuses the separated fluorescence F, and an optical detector (image acquisition device) 41 that detects the fluorescence F focused by the focusing lens 40. In the drawings, reference numeral 42 represents a barrier filter, reference numeral 43 represents a pinhole, reference numeral 25 represents a stage, and reference numeral 26 represents a mirror.

The scanner 36 is a so-called proximity galvanometer mirror that includes a first galvanometer mirror 36a for scanning the laser beam L in a main scanning direction corresponding to the left and right directions of the image and a second galvanometer mirror 36b for scanning the laser beam L in a sub scanning direction corresponding to the up and down directions of the image. In this way, the specimen 100 is two-dimensionally irradiated with the laser beam L according to a raster scan method.

The scanner 36 is connected to a scanner control device 44 that controls the scanner 36, and the scanner control device 44 is connected to a control device (CPU) 45. The CPU 45 sends an instruction for a scanning range of the laser beam L for the scanner 36 to the scanner control device 44, and the CPU 45 receives scan position information of the scanner 36 from the scanner control device 44. The CPU 45 is connected to the optical detector 41 via an A/D converter 46, and intensity information of the fluorescence F detected by the optical detector 41 is input to the CPU 45.

As an objective lens, the objective lens 34 having an image formation mode in which the incident laser beam L is imaged an odd number of times is employed.

The moving mechanism 35 includes, for example, two pairs of ball screws 47 and motors 48 (only one pair is shown in the drawings) that are capable of moving the observation head 33 along two axes orthogonal to the optical axis of the objective lens 34. The moving mechanism 35 is connected to the CPU 45 and is operated according to instructions from the CPU 45. The CPU 45 is connected to a controller 20 including a cross key 49. The CPU 45 and the controller 20 constitute an operation unit. The observer operates the cross key 49 of the controller 20 to output an operation command from the CPU 45 for operating the moving mechanism 35 in directions corresponding to the four arrows of the cross key 49. In this way, the objective lens 34 can be moved with respect to the specimen 100.

The CPU 45 is connected to a monitor (image display device) 22 via a frame memory 21. The CPU 45 is connected to, for example, a storage device 23, such as a hard disk, and a memory 24.

By linking and recording scan position information of the scanner 36 and intensity information input the CPU 45 to the memory 24 and storing information linked to the entire scanning range of the scanner 36, one set of image information is created.

The frame memory 21 has address positions corresponding to pixels in the vertical and horizontal directions of an image. Intensity information corresponding to the obtained scan positions is stored in order in the address positions of the frame memory 21. The intensity information stored in the address positions of the frame memory 21 is output to the monitor 22 every time it is stored or when a set of intensity information corresponding to one screen is stored. In this way, the captured image of the specimen 100 is displayed on the monitor 22 in real time.

According to this embodiment, the CPU 45 changes the linkage between the movement instruction signal from the controller 20 and the operation instruction signal to the moving mechanism 35 depending on whether an operation instruction is output to the scanner control device 44. In other words, when an operation instruction is not output to the scanner control device 44, an image of the specimen 100 is not displayed on the monitor 22. Therefore, if the cross key 49 of the controller 20 is pushed in this state, it is assumed that the observer is not observing the monitor 22 but is carrying out the operation while directly observing the specimen 100 and the objective lens 34.

On the other hand, when an operation instruction is output to the scanner control device 44, the intensity information from the optical detector 41 is input to the CPU 45, and an image is displayed on the monitor 22 via the frame memory 21. Therefore, if the cross key 49 of the controller 20 is pushed in this state, it is assumed that the observer is carrying out the operation while observing the monitor 22.

According this embodiment, when an operation instruction is not output to the scanner control device 44, i.e., when an image is not displayed on the monitor 22, the CPU 45 is set so that the moving mechanism 35 moves the objective lens 34 as described in the following.

Figure 7:
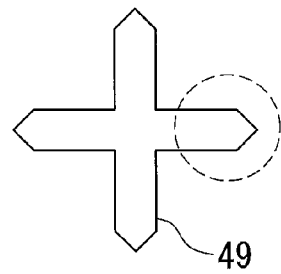
FIG. 7 illustrates the direction indicated by an arrow of a controller when observing the objective lens of the scanning examination apparatus shown in FIG. 6.
Figure 8:
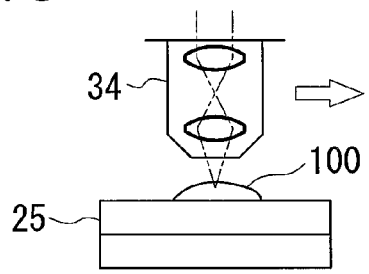
FIG. 8 illustrates the movement direction of the objective lens corresponding to the direction of the arrow of the controller shown in FIG. 7.

As shown in FIG. 7, when the arrow on the right side of the cross key 49 (the position surrounded by the dotted line in the drawing) is pushed, the objective lens 34 moves to the right (the direction of the arrow in the drawing) as shown in FIG. 8. When the arrow on the left side of the cross key 49 shown in FIG. 7 is pushed, the objective lens 34 moves to the left as shown in FIG. 8. When the arrow on the lower side of the cross key 49 is pushed, the objective lens 34 moves toward the observer, whereas when the arrow on the upper side of the cross key 49 is pushed, the objective lens 34 moves away from the observer.

On the other hand, according to this embodiment, when an operation instruction is output to the scanner control device 44, i.e., when the laser beam L is scanned by the scanner 36, the fluorescence F is detected by the optical detector 41, and the intensity information is displayed on the monitor 22 via the frame memory 21, the CPU 45 is set so that the moving mechanism 35 moves the objective lens 34 as described in the following.

Figure 9:
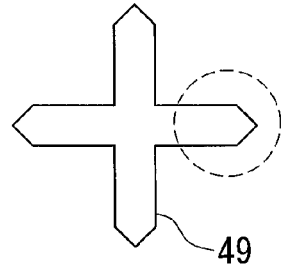
FIG. 9 illustrates the direction of the arrow of the controller in the scanning examination apparatus shown in FIG. 6 when an image of a specimen is examined on a monitor.
Figure 10:
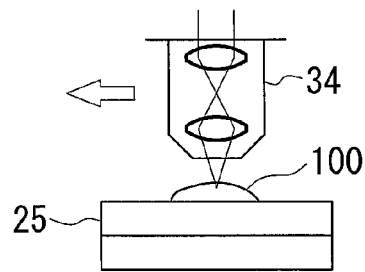
FIG. 10 illustrates the movement direction of the objective lens corresponding to the direction of the arrow of the controller shown in FIG. 9.

As shown in FIG. 9, when the arrow on the right side of the cross key 49 is pushed, the objective lens 34 moves to the left as shown in FIG. 10. When the arrow on the left side of the cross key 49 shown in FIG. 9 is pushed, the objective lens 34 moves to the right as shown in FIG. 10. When the arrow on the lower side of the cross key 49 is pushed, the objective lens 34 moves away from the observer, whereas when the arrow on the upper side of the cross key 49 is pushed, the objective lens 34 moves toward the observer.

The operation of the scanning examination apparatus 31 according to this embodiment that is configured as described above will be described below.

To observe the specimen 100 using the scanning examination apparatus 31 according this embodiment, first the objective lens 34 is moved for coarse alignment with respect to the specimen 100 placed on the stage 25. In this case, the observer carries out the alignment operation by directly viewing the specimen 100 on the stage 25 and the objective lens 34 disposed close to the specimen 100. Therefore, output of the laser beam L is not required, and the alignment operation is carried out while the laser light source 32, the scanner control device 44, the scanner 36, the frame memory 21, and the monitor 22 are in a deactivated state and while the image of the specimen 100 is not displayed on the monitor 22.

In other words, the observer operates the cross key 49 of the controller 20 to move the objective lens 34. In this case, according to this embodiment, since the arrow of the cross key 49 and the movement direction of the objective lens 34 match, the observer can intuitive recognize the arrow of the cross key 49 corresponding to the movement direction of the objective lens 34. Therefore, operability is improved, and the alignment operation can be easily carried out.

With the objective lens 34 being coarsely aligned with respect to the specimen 100 in this way, the laser light source 32, the scanner control device 44, and the monitor 22 are operated, and the laser beam L is emitted from the laser light source 32. The laser beam L generated at the laser light source 32 is two-dimensionally scanned by the scanner 36 and is incident on the specimen 100 via the pupil projection lens 37, the image-forming lens 38, and the objective lens 34. When the specimen 100 is irradiated with the laser beam L, the fluorescent material contained in the specimen 100 is excited and fluorescence F is generated. The fluorescence F generated at the specimen 100 is returned along the same path as the laser beam L via the objective lens 34, the image-forming lens 38, the pupil projection lens 37, and the scanner 36, separated at the dichroic mirror 39, focused by the focusing lens 40, and detected by the optical detector 41.

The intensity information of the fluorescence F detected by the optical detector 41 and the scan position information of the scanner 36 from the scanner control device 44 are sent to the CPU 45, linked at the CPU 45, and stored in the memory 24. Since the scan positions of the scanner 36 and the address positions of frame memory 21 are linked to each other, the intensity information of the scan positions detected by the optical detector 41 is stored in the address positions of the frame memory 21 corresponding to the scan positions. The intensity information stored in the frame memory 21 is directly displayed on the monitor 22, and one set of image information is displayed on the monitor 22 while scanning of the entire scanning range is carried out by the scanner 36.

In this case, since the scanning examination apparatus 31 according to this embodiment includes the objective lens 34 inside which image formation occurs an odd number of times, the image of the specimen 100 displayed on the monitor 22 is rotated by 180 with respect to the actual specimen 100. At the same time, since the CPU 45 outputs an operation instruction to the scanner control device 44, the correspondence between the arrows of the cross key 49 of the controller 20 and the movement directions of the objective lens 34 is changed to be opposite to that described above.

Therefore, if the observer wants to carry out fine adjustment of the observation range while observing the image of the specimen 100 displayed on the monitor 22, the image of the specimen 100 that is rotated by 180 and displayed on the monitor 22 is moved in a direction that matches the direction of the arrow of the cross key 49 when the cross key 49 of the controller 20 is operated to move the objective lens 34. In other words, when the observer carries out adjustment of the observation range while observing only the monitor 22, he or she can intuitively recognize the arrow of the cross key 49 corresponding to the desired direction for moving the observation range. Therefore, operability is improved, and fine adjustment of the observation range can be easily carried out.

The scanning examination apparatus 31 according to this embodiment has an advantage in that the observer does not make an unconscious mistake since the objective lens 34 or the observation range can be moved in a direction that matches the arrow of the cross key 49 of the controller 20 when alignment is carried out while viewing the objective lens 34 and the specimen 100 and when adjustment of the observation range is carried out while viewing only the monitor 22. As a result, there is an advantage in that losing the target position by moving the objective lens 34 in the opposite direction and missing an opportunity for examination can be prevented.

In this embodiment, the correspondence between the arrows of the cross key 49 of the controller 20 and the movement direction of the objective lens 34 is changed according to the presence of an operation instruction to the scanner control device 44. Instead, however, this can be changed according to the operation state of the scanner 36, the operation state of the frame memory 21, or the operation state of the monitor 22.

The CPU 45 and the cross key 49 of the controller 20 are described as an example of an operation unit for operating the objective lens 34 by the observer. However, the operation unit is not limited thereto, and an operation unit having another structure may be employed.

Figure 11:
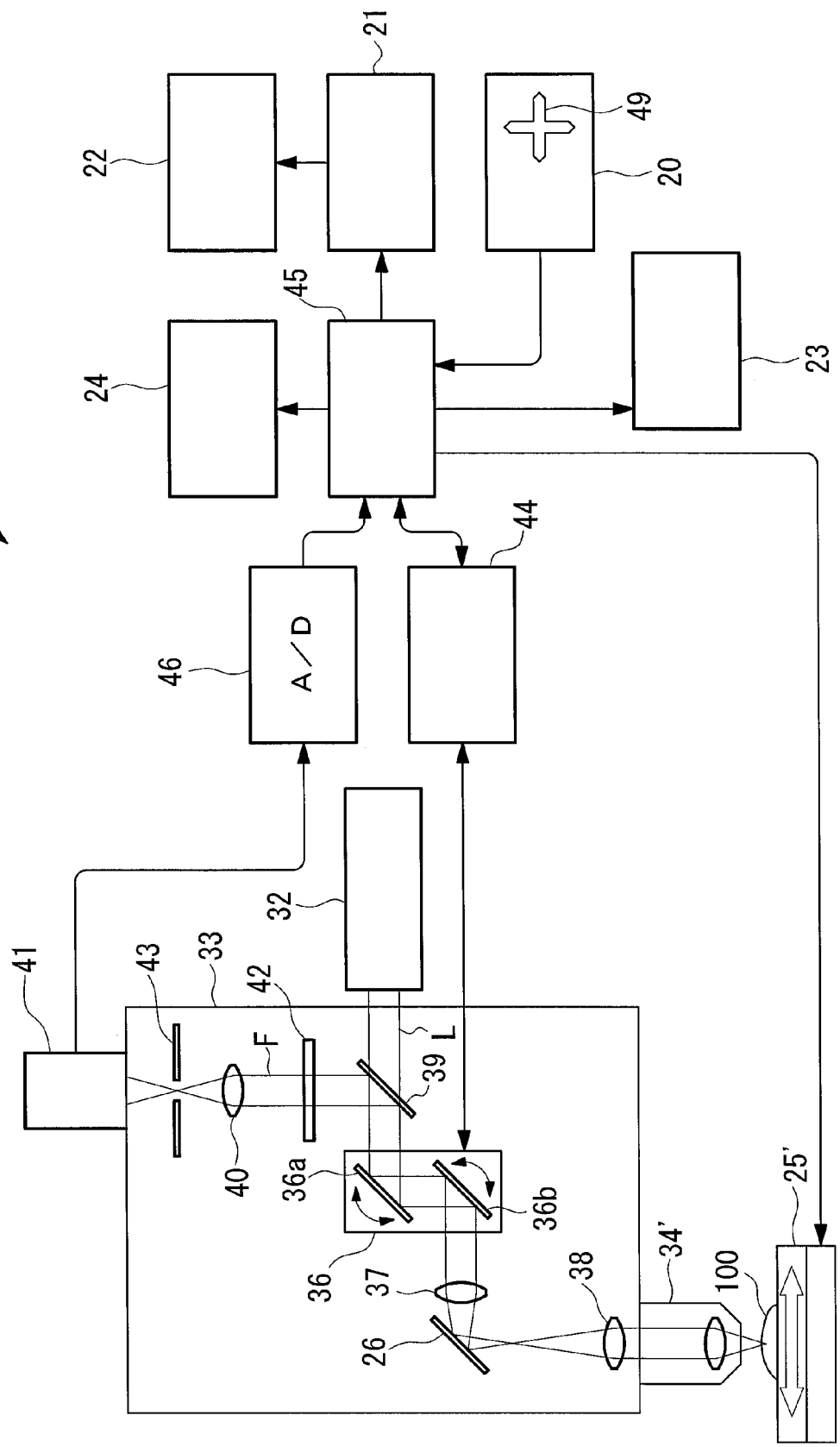
FIG. 11 illustrates the overall structure of a modification of the scanning examination apparatus shown in FIG. 6.

In the scanning examination apparatus 31 according to this embodiment, the objective lens 34 is an objective lens in which image formation of the laser beam L occurs an odd number of times and the moving mechanism 35 moves the objective lens 34 with respect to the specimen 100. Instead, however, as shown in FIG. 11, an objective lens 34' in which image formation of the laser beam L occurs zero or an even number of times may be employed, and a stage (moving mechanism) 25' that moves the specimen 100 with respect to the objective lens 34' in a direction orthogonal to the optical axis may be included.

Figure 12:
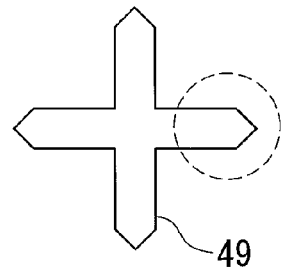
FIG. 12 illustrates the direction of the arrow of the controller of the scanning examination apparatus shown in FIG. 11 when the objective lens is observed.
Figure 13:
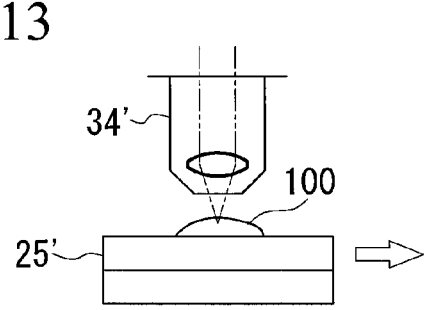
FIG. 13 illustrates the movement direction of a stage, corresponding to the direction of the arrow of the controller shown in FIG. 12.

More specifically, when coarse alignment is carried out while the stage 25' on which the specimen 100 is placed and the objective lens 34' are observed, by pushing the arrow on the right side of the cross key 49 of the controller 20, as shown in FIG. 12, the stage 25' moves to right, as shown in FIG. 13. Similarly, by matching the direction of the arrow of the cross key 49 of the controller 20 and the movement direction of the stage 25', operability can be improved since this coincides with the observer's intuition.

On the other hand, when image formation of the laser beam L occurs zero or an even number of times in the objective lens 34', the image displayed on the monitor 22 is displayed without being rotated. However, since the specimen 100 is moved with respect to the objective lens 34', if the arrow of the cross key 49 of the controller 20 matches the movement direction of the stage 25', the image on the monitor 22 will move in the opposite to that intended by the observer.

Figure 14:
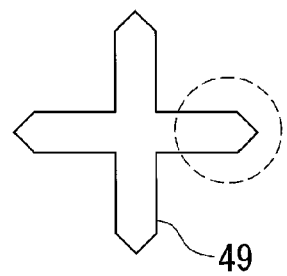
FIG. 14 illustrates the direction of the arrow of the controller in the scanning examination apparatus shown in FIG. 11 when an image of a specimen is examined on a monitor.
Figure 15:
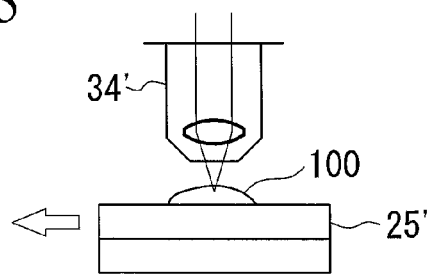
FIG. 15 illustrates the movement direction of a stage, corresponding to the direction of the arrow of the controller shown in FIG. 14.

Therefore, according to this embodiment, when observation is carried out with the monitor 22, the correspondence of the cross key 49 of the controller 20 and the movement direction of the stage 25' is reversed. In other words, as shown in FIG. 14, when the arrow on the right side of the cross key 49 is pushed, the stage 25' moves left, as indicated by the arrow in FIG. 15. By reversing the direction of the arrow of the cross key 49 of the controller 20 and the movement direction of the stage 25', operability can be improved since this coincides with the observer's intuition. In this way, in any of the cases, the observer can intuitively recognize the movement direction of the specimen 100 or the observation range, and problems such as losing the target position and missing an opportunity for examination can be prevented.

According to this embodiment, a laser scanning fluorescence examination apparatus is provided as an example. However, the examination apparatus is not limited thereto, and any other type of examination apparatus that is capable of examining an image of the specimen 100 using the monitor 22 may be employed.

Figure 16:
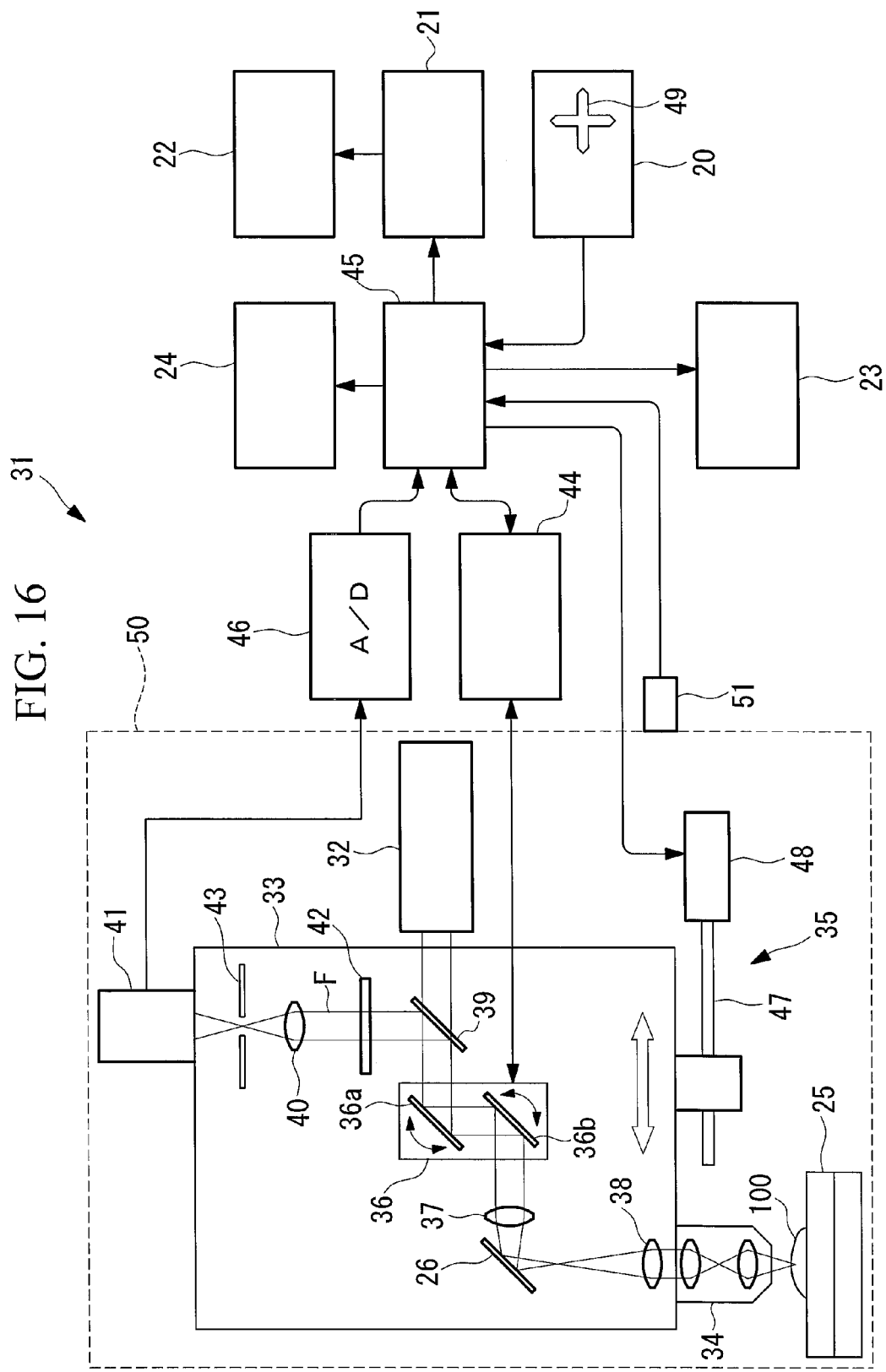
FIG. 16 illustrates the overall structure of another modification of the scanning examination apparatus shown in FIG. 6.

In the case of the scanning examination apparatus 31 using the laser beam L, since leakage of the laser beam L must be prevented, at least the objective lens 34 and the specimen 100 may be covered. For example, as shown in FIG. 16, the entire observation head 33 may be covered with a black box (cover) 50 to prevent the laser beam L from leaking outside.

In this case, the operation of placing the specimen 100 on the stage 25 and aligning the objective lens 34 with respect to the specimen 100 is carried out with the black box 50 open. After coarse alignment is completed, the black box 50 is closed. Subsequently, the image of the specimen 100 is observed on the monitor 22. In other words, when observation on the monitor 22 is carried out, the specimen 100 and the objective lens 34 cannot be visually observed.

Therefore, in this case, a sensor 51 for detecting the open or closed state of the black box 50 may be provided and the correspondence between the direction of the arrow of the controller 20 and the movement direction of the objective lens 34 may be reversed by the CPU 45 depending on the output of the sensor 51.

Next, scanning examination apparatuses according to fourth and fifth embodiments are described with reference to the drawings. The scanning examination apparatuses according to the fourth and fifth embodiments are scanning microscopes.

The fourth and fifth embodiments, described below, both use an optical system of a confocal scanning fluorescence microscope, which is a scanning examination apparatus, to two-dimensionally scan a specimen to acquire information about the shape of the specimen. More specifically, with the fourth embodiment, scanning is carried out in a limited specimen scanning range. With the fifth embodiment, the acquired image is corrected in real time and an image used for correction is created.

4. Fourth Embodiment

Figure 17:
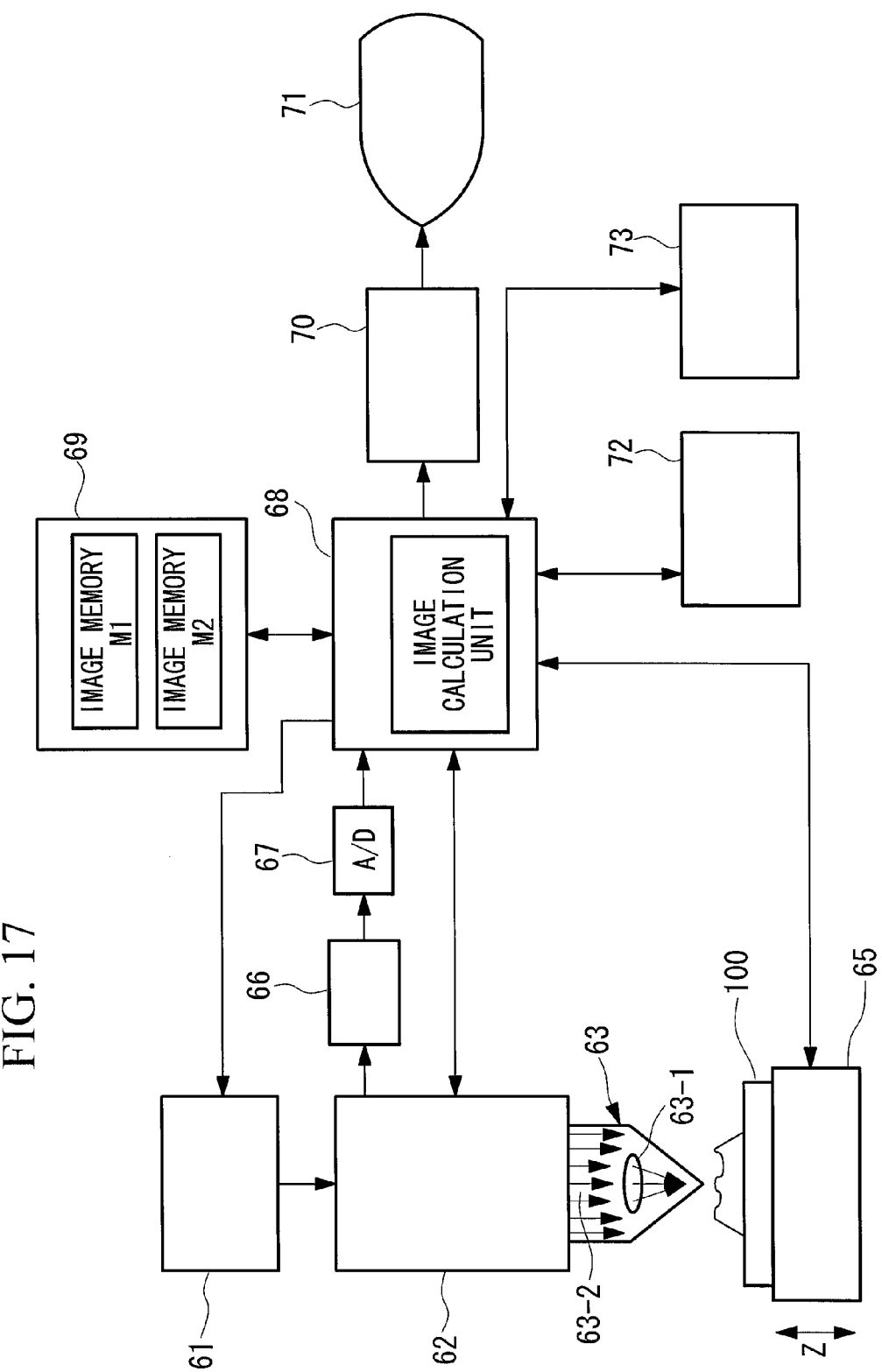
FIG. 17 is a schematic view illustrating, in outline, the structure of a scanning examination apparatus according to a fourth embodiment of the present invention.

A scanning examination apparatus according the fourth embodiment of the present invention will be described below with reference to FIGS. 17 and 18. FIG. 17 illustrates, in outline, the structure of a confocal scanning microscope according to the present invention.

The scanning examination apparatus according to this embodiment includes a light source 61 that emits a spot of light, such as a laser beam, an objective lens 63 that focuses the light emitted from the light source 61 on a specimen 100, a scanner 62 for two-dimensional scanning that relatively scans the focused light over the surface of the specimen 100, an optical detector 66 that detects the intensity of the fluorescence from the specimen 100, and a CPU (control unit) 68 that controls the light source 61. In the drawings, reference numeral 65 represents a stage on which the specimen 100 is placed. The stage is movable in the Z-axis direction and can move the specimen 100 in the optical-axis direction of the spot of light.

The scanner 62 for two-dimensional scanning two-dimensionally scans the spot of light from the light source 61 on the specimen 100 and includes, for example, a galvanometer mirror or a resonant scanner for scanning in the X-axis direction and a galvanometer mirror for scanning in the Y-axis direction. By swinging the X scanner and the Y scanner in the X-axis direction and the Y-axis direction, the spot of light can be scanned in the XY directions on the specimen 100.

The optical detector 66 has a pinhole (not shown) in front of the light-receiving surface, receives optical information obtained through the pinhole, and converts the optical information into an electrical signal according to the light intensity.

A CPU 68 is connected to the optical detector 66 via an A/D converter 67. Furthermore, the CPU 68 is connected not only to the light source 61, the scanner 62 for two-dimensional scanning, and the stage 65 but also to a display unit 71, a storage device 72, and an input device 73 via a memory 69 and a frame memory 70.

The storage device 72 holds position information of a target region, which is described below, input from the input device 73.

The CPU 68 controls the scanner 62 for two-dimensional scanning to control a scanning range 75 (see FIG. 18) of the spot of light incident on the specimen 100 and controls the ON/OFF state of the light source 61 to control the irradiation position of the spot of light on the specimen 100.

The CPU 68 forms a fluorescence image (detection image) on the basis of fluorescence intensity obtained via the A/D converter 67 and position information of the spot of light from the scanner 62 for two-dimensional scanning and outputs the fluorescence image to the frame memory 70. The fluorescence image output to the frame memory 70 is displayed sequentially on the display unit 71.

The CPU 68 instructs the ON/OFF state to the light source 61 for each laser wavelength and adjusts the intensity of the light emitted onto the specimen 100 through the objective lens 63.

Here, as the CPU 68, the memory 69, and the frame memory 70, a standard personal computer may be used.

The operation of the scanning examination apparatus according to this embodiment, having the above-described structure, will be described with reference to FIGS. 17 and 18.

The laser beam emitted from the light source 61 passes through the scanner 62 for two-dimensional scanning and reaches the objective lens 63. At this time, the light 63-2 emitted from the scanner 62 for two-dimensional scanning is emitted in a range that exceeds a viewing range 63-1 of the objective lens 63. At this time, the fluorescence generated at the specimen 100 by irradiating the specimen 100 with the laser beam is collected by the objective lens 63, returned through the scanner 62 for two-dimensional scanning, and detected by the optical detector 66. Information about the intensity of the detected light is sent to the CPU 68 via the A/D converter 67 and is loaded into the memory 69. An image of the loaded microscope image G is shown in FIG. 18.

Figure 18:
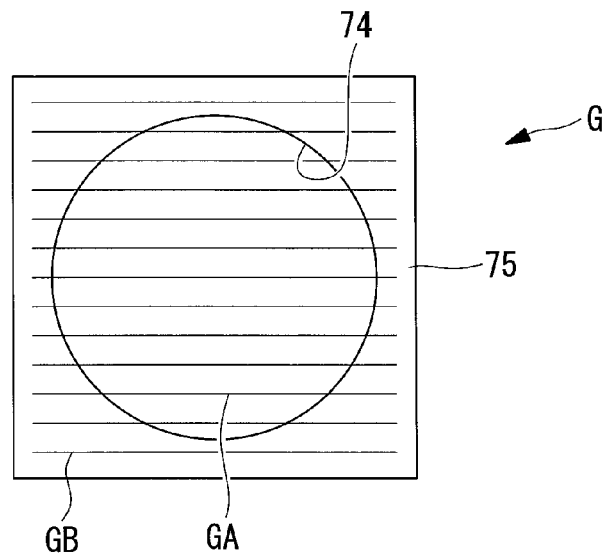
FIG. 18 is a plan view illustrating the relationship between the viewing range and a scanning range of the scanning examination apparatus shown in FIG. 17.
Figure 19:
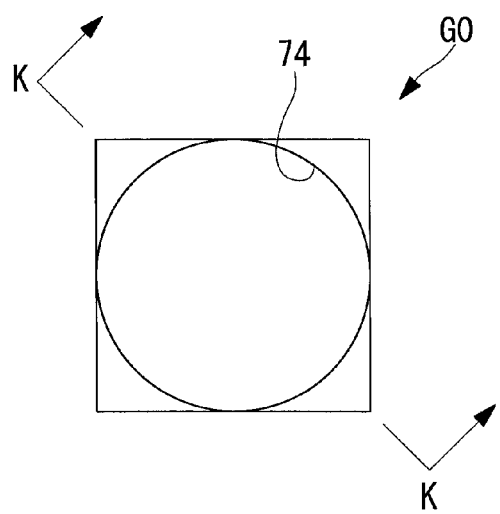
FIG. 19 is a plan view illustrating an example binary image stored in a binary-image storage unit of a scanning examination apparatus according to a fifth embodiment of the present invention.

An effective range of the microscope image shown in FIG. 18 is the inside of a circular field of view 74. Since the scanning examination apparatus according to this embodiment irradiates only the inside of the circular field of view 74 in the effective range with the laser beam, the circular field of view 74 is defined as a target range. However, so long as the objective lens 63 is the same and the scanning range of the scanner 62 for two-dimensional scanning is the same, the target range does not change. Therefore, the target range is registered in the storage device 72 and called up each time for use. In this way, the ranges inside and outside the circular field of view 74 included in the microscope image G in FIG. 18 can be more easily set. The CPU 68 outputs an ON command to the light source 61 only when the positions of the galvanometer mirrors of the scanner 62 for two-dimensional scanning are at positions at which the circular field of view 74 is irradiated with the spot of light. When outside the circular field of view 74 is irradiated with the spot of light, an OFF command is output to the light source 61.

In this way, by turning on or off the laser beam emitted from the light source 61, the system can be configured to pass the light 63-2 emitted from the scanner 62 for two-dimensional scanning, shown in FIG. 17, through only the viewing range 63-1. Thus, the microscope image G that has luminance only in an region GA inside the circular field of view 74 shown in FIG. 18 and that does not have luminance in a region GB outside the circular field of view 74 can be acquired.

5. Fifth Embodiment

A scanning examination apparatus according to the fifth embodiment of the present invention will be described with reference to FIGS. 17 to 24.

The basic structure of the scanning examination apparatus according to this embodiment is the same as that of the fourth embodiment. The difference from the fourth embodiment is that a binary image G0 is stored inside a storage device (binary image storage unit) 72 and a microscope image G is obtained by carrying out inter-image computation using the binary image G0 stored in the storage device 72.

The operation of the scanning examination apparatus according to this embodiment, having the above-described structure, will be described.

The binary image G0 (see FIG. 19), whose pixel value inside the circular field of view 74 is one and whose pixel value outside the circular field of view 74 is zero, is stored in advance in the storage device 72 shown in FIG. 17. The binary image G0 can be created by, for example, the following method.

Figure 20:
FIG. 20 is a luminance distribution diagram along line K-K in FIG. 19.

First, in the structure shown in FIG. 17, a laser beam is emitted from the light source 61 while the specimen 100 is not disposed on the stage 65. Since the specimen 100 is not provided, fluorescence returning from the viewing range 63-1 of the objective lens 63 is not generated. On the other hand, returned light reflected at the lens barrel is detected outside the viewing range 63-1. In particular, by increasing the intensity of light emitted from the light source 61, light from the outside of the viewing range 63-1 is detected at the optical detector 66, and information about the detected light intensity is loaded into an image memory M1 of the memory 69 via the CPU 68. At this time, luminance data for the constructed image exists only outside the circular field of view 74 shown in FIG. 19, and luminance data does not exist inside the circular field of view 74. Thus, the binary image G0 is acquired by processing the image at the CPU 68 and setting the pixel value of the area having luminance to zero and the pixel value of the area not having luminance to one, as shown in FIG. 20. The result is stored in the storage device 72.

Figure 21:
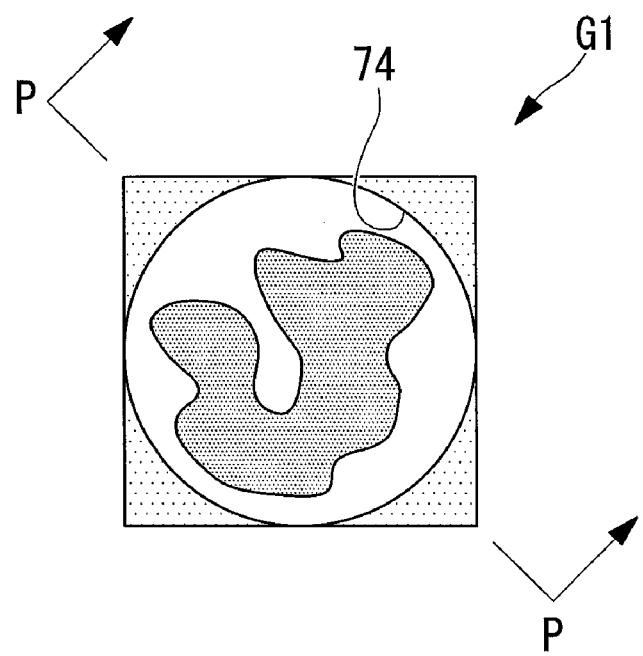
FIG. 21 is a plan view illustrating an example fluorescence image acquired by the scanning examination apparatus according to the fifth embodiment of the present invention.
Figure 22:
FIG. 22 is a luminance distribution diagram along line P-P in FIG. 21.
Figure 23:
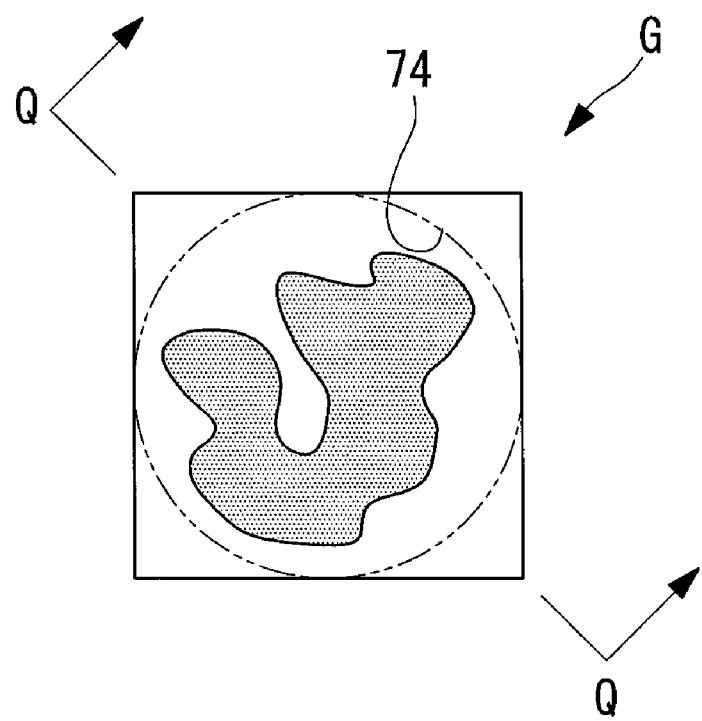
FIG. 23 is a plan view illustrating a microscope image acquired as a result of a logical AND operation of the binary image shown in FIG. 19 and the fluorescence image shown in FIG. 21.
Figure 24:
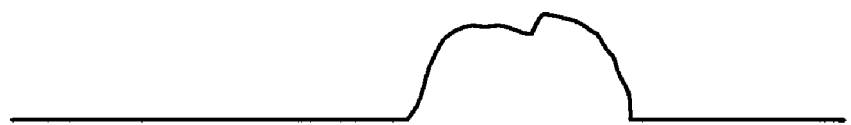
FIG. 24 is a luminance distribution diagram along line Q-Q in FIG. 23.

Then, when acquiring a microscope image, the specimen 100 is disposed on the stage 65 and is irradiated with a laser beam, and a fluorescence image (detection image) G1 (see FIG. 21) obtained by detecting the fluorescence returned from the specimen 100 is loaded into the memory 69. The luminance distribution of the fluorescence image G1 along the cross-sectional plane PP in FIG. 21 is shown in FIG. 22.

Each time the fluorescence image G1 is acquired, the CPU 68 reads the binary image G0 that has been provided in advance from the storage device 72 in real time and performs a logical AND operation with the fluorescence image G1 loaded into the memory 69. In this way, only the intensity information inside the circular field of view 74 remains, and a microscope image G not having luminance outside the circular field of view 74 can be acquired (see FIGS. 23 and 24). Therefore, a high-definition microscope image G that can be easily analyzed can be readily acquired.

In the above-described embodiment, an epi-illumination system was described. For a transmitting illumination system, opposite to the above-described case, an image having luminance only inside the circular field of view 74 can be acquired by detecting the transmitted light while the specimen 100 is not disposed on the stage 65. Therefore, opposite to the above-described case, by processing the acquired image to set the pixel value of the area having luminance to one and the pixel value of the area not having luminance to zero, a binary image that is substantially the same as that described above can be prepared.

Additional Items

The following aspects of the present invention are derived from the above-described third embodiment.

[Additional Item 1]

An examination apparatus includes an objective lens in which image formation of transmitted light occurs an odd number of times, a moving mechanism for moving the objective lens with respect to a specimen in a direction intersecting with an optical axis, an operation unit for operating the moving mechanism, an image acquisition device for acquiring an image of the specimen on the basis of the light acquired through the objective lens, and an image display device for displaying the image acquired by the image acquisition device, wherein the operation unit reverses the direction in which the objective lens is moved by the moving mechanism depending on an operating state of the image display device.

According to this structure, when an observer operates the moving mechanism by operating the operation unit, the objective lens moves with respect to the specimen in a direction intersecting the optical axis. In such a case, since image formation of the transmitted light occurs an odd number of times in the objective lens, the image displayed on the monitor is rotated by 180 with respect to the actual specimen. If no countermeasure is taken, the relative direction in which the specimen and the objective lens are moved according to the observer's intention when the operation unit is operated while observing the objective lens from outside and when the operation unit is operated while observing the monitor is reversed.

If the operation unit is operated when the image display device is not operated, the operation direction of the operation unit and the movement direction of the objective lens are matched based on the assumption that the observer is operating the operation unit while observing the objective lens from outside. When the image display device is operated, the movement direction is reversed to constantly match the relative movement directions in which the specimen and the objective lens are moved according to the observer's intention. In this way, problems such as losing the target position and missing an opportunity of examination can be prevented.

[Additional Item 2]

An examination apparatus includes an objective lens in which image formation of transmitted light occurs zero or an even number of times, a moving mechanism for moving a specimen with respect to the objective lens in a direction intersecting the optical axis, an operation unit for operating the moving mechanism, an image acquisition device for acquiring an image of the specimen on the basis of the light acquired through the objective lens, and an image display device for displaying the image acquired by the image acquisition device, wherein the operation unit reverses the direction in which the objective lens is moved by the moving mechanism depending on an operating state of the image acquisition device.

According to this structure, when the observer operates the moving mechanism by operating the operation unit, the objective lens moves with respect to the specimen in a direction intersecting the optical axis. In such a case, since image formation of the transmitted light occurs zero or an even number of times in the objective lens, the image displayed on the monitor is not rotated with respect to the actual specimen. Therefore, if no countermeasure is taken, when the specimen is moved by operating the operation unit, the relative direction in which the specimen and the objective lens are moved according to the observer's intention when the operation unit is operated while observing the objective lens from outside and when the operation unit is operated while observing the monitor is reversed.

If the operation unit is operated when the image display device is not operated, the operation direction of the operation unit and the movement direction of the objective lens are matched based on the assumption that the observer is operating the operation unit while observing the objective lens from outside. When the image display device is operated, the movement direction is reversed to constantly match the relative movement directions in which the specimen and the objective lens are moved according to the observer's intention. In this way, problems such as losing the target position and missing an opportunity for examination can be prevented.

[Additional Item 3]

An examination apparatus includes an objective lens in which image formation of transmitted light occurs an odd number of times, a moving mechanism for moving the objective lens with respect to a specimen in a direction intersecting an optical axis, an operation unit for operating the moving mechanism, an image acquisition device for acquiring an image of the specimen on the basis of the light acquired through the objective lens, an image display device for displaying the image acquired by the image acquisition device, and an openable and closable cover for covering at least the objective lens and the specimen, wherein the operation unit reverses the direction in which the objective lens is moved by the moving mechanism depending on an open or closed state of the cover.

According to this structure, when an observer operates the moving mechanism by operating the operation unit, the objective lens moves with respect to the specimen in a direction intersecting the optical axis. In such a case, since image formation of the light transmitted through the objective lens occurs an odd number of times, the image displayed on the monitor is rotated by 180 with respect to the actual specimen. Therefore, if no countermeasure is taken, when the specimen is moved by operating the operation unit, the relative direction in which the specimen and the objective lens are moved according to the observer's intention when the operation unit is operated while observing the objective lens from outside and when the operation unit is operated while observing only the monitor is reversed.

When the cover is open, operation can be carried out while observing the specimen and the objective lens from the outside. On the other hand, with the cover closed, at least the objective lens and the specimen are covered and cannot be observed. Therefore, when the operation unit is operated with the cover open, the operation direction of the operation unit and the movement direction of the objective lens are matched based on the assumption that the observer is operating the operation unit while observing the objective lens from outside. When the cover is closed, the movement direction is reversed to constantly match the relative movement directions in which the specimen and the objective lens are moved according to the observer's intention. In this way, problems such as losing the target position and missing an opportunity for examination can be prevented.

[Additional Item 4]

An examination apparatus includes an objective lens in which image formation of transmitted light occurs zero or an even number of times, a moving mechanism for moving a specimen with respect to the objective lens in a direction intersecting an optical axis, an operation unit for operating the moving mechanism, an image acquisition device for acquiring an image of the specimen on the basis of the light acquired through the objective lens, an image display device for displaying the image acquired by the image acquisition device, and an openable and closable cover for covering at least the objective lens and the specimen, wherein the operation unit reverses the direction in which the objective lens is moved by the moving mechanism depending on an open or closed state of the cover.

According to this structure, when an observer operates the moving mechanism by operating the operation unit, the objective lens moves with respect to the specimen in a direction intersecting the optical axis. In such a case, since image formation of the light transmitted occurs zero or an even number of times in the objective lens, the image displayed on the monitor is not rotated with respect to the actual specimen.

Therefore, if no countermeasure is taken, when the specimen is moved by operating the operation unit, the relative direction in which the specimen and the objective lens are moved according to the observer's intention when the operation unit is operated while observing the objective lens from outside and when the operation unit is operated is reversed.

When the operation unit is operated with the cover open, the operation direction of the operation unit and the movement direction of the specimen are matched based on the assumption that the observer is operating the operation unit while observing the objective lens from outside. When the cover is closed, the movement direction of the specimen is revered based on the assumption that the observer is observing the specimen on the monitor, to constantly match the relative movement directions in which the specimen and the objective lens are moved according to the observer's intention. In this way, problems such as losing the target position and missing an opportunity for examination can be prevented.

The following aspects of the present invention are derived from the fourth and fifth embodiments.

[Additional Item 5]

A scanning microscope includes a light source, an objective lens that focuses light emitted from the light source onto a specimen, a scanning mechanism that relatively scans the focused light over a surface of the specimen, an optical detector that detects the intensity of reflected light, transmitted light, or fluorescence from the specimen, and control unit that radiates emission light from the light source to only the inside of a circular field of view of the objective lens when a scanning range is a quadrangle in which the circular field of view is inscribed.

According to this structure, since emission light from the light source is radiated to only a region corresponding to the inside of the circular field of view by operating the control unit, the region outside the circular field of view is not irradiated with the emission light, and generation of unwanted light outside the circular field of view is prevented. Therefore, indistinctness of a desired image inside the circular field of view due to abnormal luminance of unwanted light can be prevented.

As a result, a method is provided for completely ignoring luminance data other than accurate image information that may be generated when an image is formed by efficiently using the viewing range of an objective lens that only has a viewing range that is smaller than the scanning range or when an image is formed using the entire circular field of view to maximize the performance of a normal objective lens. Furthermore, the present invention can be realized without modifying known hardware or adding other components.

[Additional Item 6]

A scanning microscope includes a light source, an objective lens that focuses light emitted from the light source onto a specimen, a scanning mechanism for relatively scanning the focused light over a surface of the specimen, an optical detector for detecting the intensity of reflected light, transmitted light, or fluorescence from the specimen, and binary-image storage unit for storing a binary image having different pixel values inside and outside a circular field of view of the objective lens for an entire scanning range constituting a quadrangle in which the circular field of view is inscribed, and calculation unit for calculating a logical AND of the binary image stored in the binary-image storage unit and a detection image acquired by the optical detector.

According to this structure, by operating the calculation unit, the logical AND of the binary image stored in the binary-image storage unit in advance and the image acquired by the optical detector is calculated. The binary image has different pixel values inside and outside the circular field of view. For example, by setting the pixel value of the outside of the circular field of view to zero and setting the pixel value of inside the circular field of view to one, as a result of the logical AND operation, the pixel value of outside the circular field of view becomes zero, and an image that only has a pixel value for inside the circular field of view is acquired. Therefore, analysis of the acquired image becomes easy.

As a result, a method is provided for completely ignoring luminance data other than accurate image information that may be generated when an image is formed by efficiently using the viewing range of an objective lens that only has a viewing range that is smaller than the scanning range or when an image is formed using the entire circular field of view, thus maximizing the performance of a normal objective lens. Furthermore, the present invention can be realized without modifying a known hardware and by adding units.

[Additional Item 7]

In the scanning microscope according to Additional Item 6, the calculation unit calculates the logical AND in real time.

According to this structure, since the calculation unit calculates the logical AND in real time, an image of the inside of the circular field of view can be observed in real time while the image is being acquired.

[Additional Item 8]

The scanning microscope according to Additional Item 6 or 7 further includes binary-image acquisition unit for acquiring a binary image by reflecting emission light from the light source at only the outside of the circular field of view of the objective lens and digitizing the detected image acquired by the optical detector.

According to this structure, a binary image having different pixel values inside and outside the circular field of view can be easily acquired on the basis of light reflected at only the outside of the circular field of view by operating the binary-image acquisition unit.

[Additional Item 9]

The scanning microscope according to Additional Item 6 or 7 further includes binary-image acquisition unit for acquiring a binary image by transmitting emission light from the light source through only the inside of the circular field of view of the objective lens when the specimen is not placed inside the circular field of view of the objective lens and digitizing the image detected by the optical detector.

According to this structure, a binary image having different pixel values inside and outside the circular field of view can be easily acquired on the basis of light transmitted through only the inside of the circular field of view by operating the binary-image acquisition unit.

The invention claimed is:

1. A scanning examination apparatus comprising:
   a detachable objective lens;
   a scanner for two-dimensionally scanning light from a specimen focused by the objective lens;
   a scanner control device for controlling the operation of the scanner; and
   an optical detector for detecting light scanned by the scanner, wherein the scanner control device changes the scanning direction of the light depending on an image formation mode of the light in the objective lens which is attached.

2. The scanning examination apparatus according to claim 1, wherein the scanner scans the light in two directions orthogonal to each other, and wherein the scanner control device carries out control to scan the light in directions opposite to the two directions when image formation occurs an odd number of times in the objective lens and when image formation occurs zero or an even number of times.

* * * * *